(12) United States Patent  
Sasai

(10) Patent No.: US 8,538,582 B2  
(45) Date of Patent: Sep. 17, 2013

(54) ROBOT AND NOISE REMOVING METHOD FOR THE ROBOT

(75) Inventor: Shigenori Sasai, Shiojiri (JP)

(73) Assignee: Seiko Epson Corporation (JP)

( * ) Notice: Subject to any disclaimer, the term of this patent is extended or adjusted under 35 U.S.C. 154(b) by 71 days.

(21) Appl. No.: 13/344,115

(22) Filed: Jan. 5, 2012

(65) Prior Publication Data

US 2012/0179294 A1    Jul. 12, 2012

(30) Foreign Application Priority Data

Jan. 6, 2011   (JP) ................................. 2011-000979

(51) Int. Cl.
*G05B 19/404*   (2006.01)

(52) U.S. Cl.
USPC .................. 700/254; 901/9; 901/46; 702/190; 702/191; 702/195

(58) Field of Classification Search
CPC ...... B25J 9/1607; B25J 9/1638; B25J 9/1641; B25J 9/1653; G05B 2219/37388
USPC .................. 702/190–191; 318/611
See application file for complete search history.

(56) References Cited

U.S. PATENT DOCUMENTS

| 5,805,212 | A  | * | 9/1998 | Fujiwara .................... 348/208.8 |
| 7,765,023 | B2 |   | 7/2010 | Oaki et al. |
| 7,902,780 | B2 | * | 3/2011 | Okita et al. .................... 318/432 |
| 2010/0148714 | A1 | * | 6/2010 | Okita et al. .................... 318/561 |
| 2010/0164425 | A1 | * | 7/2010 | Son et al. ....................... 318/648 |
| 2012/0075109 | A1 | * | 3/2012 | Wang et al. ................. 340/686.1 |
| 2013/0012930 | A1 | * | 1/2013 | Ruiz Morales et al. ........... 606/1 |

FOREIGN PATENT DOCUMENTS

JP         3883544        11/2006

* cited by examiner

*Primary Examiner* — Khoi Tran  
*Assistant Examiner* — Ryan Rink  
(74) *Attorney, Agent, or Firm* — Harness, Dickey & Pierce, P.L.C.

(57) ABSTRACT

A robot includes: an arm driven by a motor; an angle sensor that detects a pivoting angle of the motor; an inertia sensor that detects an inertial force acting on the arm; a noise detecting unit that detects a noise frequency of the inertia sensor from both an output of the angle sensor and an output of the inertia sensor; a filter-constant determining unit that determines a characteristic of a filter from information of the noise detecting unit; and the filter that removes noise of the inertia sensor on the basis of the filter-constant determining unit.

11 Claims, 6 Drawing Sheets

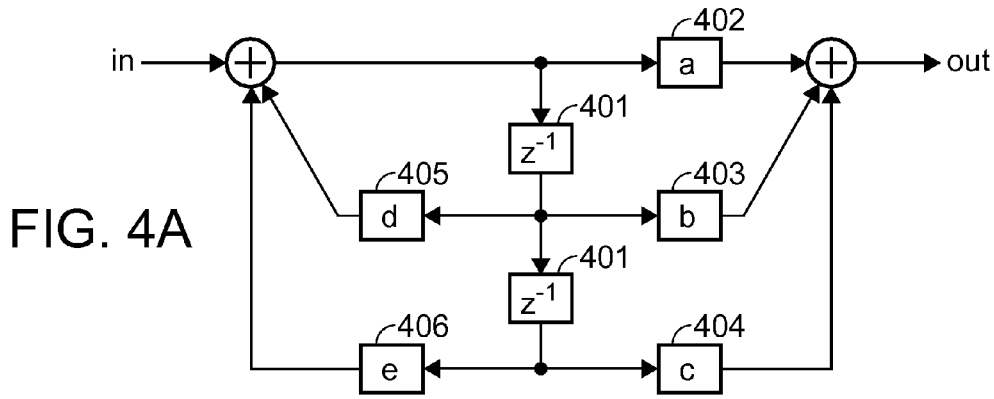
FIG. 4A
| NOISE FREQUENCY | a | b | c | d | e |
|---|---|---|---|---|---|
| 1100 | 0.981 | -1.27413 | 0.981 | 1.27413 | -0.96148 |
| 1200 | 0.98074 | -1.15315 | 0.98074 | 1.15352 | -0.96148 |
| 1300 | 0.98074 | -1.02507 | 0.98074 | 1.025069 | -0.96148 |
| 1400 | 0.98074 | -0.89066 | 0.98074 | 0.89067 | -0.96148 |
| 1500 | 0.98074 | -0.75077 | 0.98074 | 0.75077 | -0.96148 |
FIG. 4B
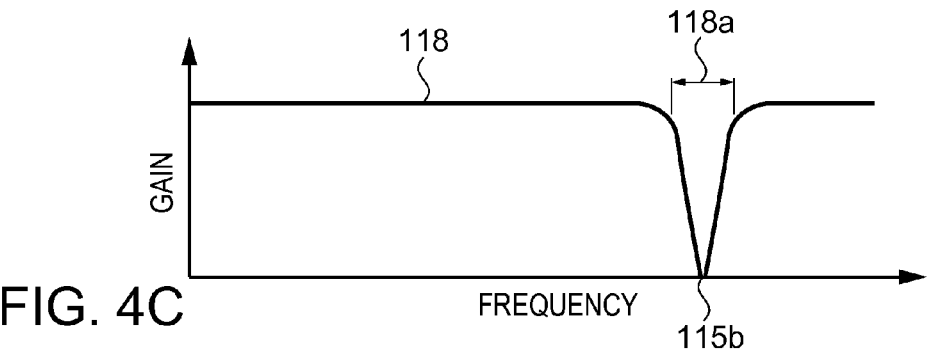
FIG. 4C

ROBOT AND NOISE REMOVING METHOD FOR THE ROBOT

The entire disclosure of Japanese Patent Application No. 2011-000979 filed Jan. 6, 2011 is expressly incorporated by reference.

BACKGROUND

1. Technical Field

The present invention relates to a robot and a noise removing method for the robot and, more particularly, to a control method for the robot.

2. Related Art

When an arm of a robot is actuated and then stopped, the arm oscillates. Since the robot cannot perform work with high position accuracy while the arm is oscillating, the robot sometimes stays in a standby mode until the arm stops oscillating. When the speed of the arm is increased, the oscillation of the arm increases during the stopping event. As a result, the time until the oscillation stops also increases. Therefore, for example, a method of reducing residual oscillation using an inertia sensor in a robot is disclosed in Japanese Patent No. 3883544. The residual oscillation occurs because large elasticity is present between a motor and the distal end of the arm. Rotation information of the motor can be acquired using only a position sensor represented by an encoder. However, information concerning the distal end of the arm can be more accurately acquired by attaching the inertia sensor. This information is fed back to a control unit to reduce the residual oscillation.

To use the inertia sensor, it is necessary to take noise into account. In particular, in an oscillation type gyro sensor, when mechanical oscillation is applied to the gyro sensor, an extremely large detuning frequency noise occurs. When a feedback system that controls the arm using an output of the inertia sensor is built, the feedback system oscillates and the robot sometimes does not operate. Therefore, there is a demand for a robot that prevents oscillation of the feedback system including an inertia sensor.

SUMMARY

An advantage of some aspects of the invention is to solve at least a part of the problems described above, and the invention can be implemented in the following forms or application examples.

APPLICATION EXAMPLE 1

This application example of the invention is directed to a robot including: an arm; an arm coupling section connected to the arm and including a driving source that pivots or translates the arm; a base connected to the arm coupling section; an angle sensor that detects a pivoting angle of the driving source; an inertia sensor that is attached to the arm and detects an inertial force acting on the arm; a noise filter that removes noise from an output of the inertia sensor; a control unit that controls a pivoting action of the arm; a noise detecting unit that detects a noise frequency of the inertia sensor from an output of the angle sensor and the output of the inertia sensor; and a filter-constant determining unit that determines, using the noise frequency, a noise filter characteristic of the noise filter for removing noise.

According to the application example, the arm is connected to the base via the arm coupling section. The arm coupling section includes the driving source. The driving source pivots or translates the arm. The control unit controls the driving source to thereby control a pivoting action of the arm. The angle sensor is set in the driving source. The angle sensor detects a pivoting angle of the driving source. The control unit recognizes a pivoting state of the arm on the basis of information concerning the pivoting angle of the driving source.

The inertia sensor is attached to the arm. The control unit recognizes a pivoting state of the arm using an output of the inertia sensor. The noise detecting unit detects a noise frequency in noise peculiar to the inertia sensor using an output of the angle sensor and the output of the inertia sensor. The filter-constant determining unit determines a noise filter characteristic using the noise frequency. The noise filter characteristic is determined according to a characteristic peculiar to the inertia sensor. The noise filter is connected to the inertia sensor. The noise filter removes noise from the output of the inertia sensor according to the noise filter characteristic. Therefore, the control unit can control the arm using the output of the inertia sensor in which the noise is reduced. As a result, the control unit can prevent oscillation of a feedback system including the inertia sensor.

APPLICATION EXAMPLE 2

In the robot according to the application example described above, it is preferable that the noise detecting unit detects a noise frequency of a signal output by the inertia sensor using a frequency distribution of a signal output by the angle sensor and a frequency distribution of the signal output by the inertia sensor.

According to this application example, both the frequency distribution of the signal output by the angle sensor and the frequency distribution of the signal output by the inertia sensor are used. Therefore, it is possible to separate a frequency distribution of a signal of a noise component from an oscillation frequency distribution of a signal detected by the inertia sensor. As a result, it is possible to accurately specify a noise frequency.

APPLICATION EXAMPLE 3

In the robot according to the application example described above, it is preferable that the noise filter is a band rejection filter.

According to this application example, it is possible to reduce a phase change in bands other than a frequency band that should be removed. It is possible to remove a signal in a frequency band of a noise component from a signal output by the inertia sensor.

APPLICATION EXAMPLE 4

In the robot according to the application example described above, it is preferable that the filter-constant determining unit determines a filter constant referring to the noise frequency and a table.

According to this application example, it is possible to determine a filter constant without requiring complicated calculation. Therefore, it is possible to reduce the burdens related to calculation.

APPLICATION EXAMPLE 5

In the robot according to the application example described above, it is preferable that the noise filter is implemented in the control unit as software.

According to this application example, electronic components and the like for the noise filter are unnecessary. Thus, it is possible to reduce man-hours for soldering and the like. Therefore, it is possible to manufacture the robot with high productivity.

APPLICATION EXAMPLE 6

This application example of the invention is directed to a robot including: an arm body to which plural arms and plural arm coupling sections connected to the arms and including driving sources that pivot or translate the arms are alternately coupled; a base connected to the arm body; plural angle sensors that detect pivoting angles of the driving sources; plural inertia sensors that detect inertial forces acting on the arms; plural noise filters that remove noise from outputs of the inertia sensors; a control unit that controls pivoting actions of the arms; a noise detecting unit that detects noise frequencies of the plural inertia sensors from outputs of the plural angle sensors and the outputs of the plural inertia sensors; and a filter-constant determining unit that determines, using the noise frequencies, noise filter characteristics of the noise filters for removing noise.

According to this application example, the robot includes the arm body to which the plural arms and the plural arm coupling sections are alternately coupled. Consequently, the arms can move freely. The plural arms are provided and the plural inertia sensors that detect inertial forces acting on the arms are provided. The plural arm coupling sections are also provided. The plural angle sensors are provided in the arm body.

The noise detecting unit detects noise frequencies of the inertia sensors from outputs of the plural angle sensors and outputs of the plural inertia sensors. The filter-constant determining unit determines noise filter characteristics corresponding to the inertia sensors using the noise frequencies. Therefore, the noise filters can remove noise of the inertia sensors. As a result, in the robot including the arm body to which the arms and the arm coupling sections are alternately couple, as in the robot according to the application example explained above, the control unit can prevent oscillation of a feedback system including the inertia sensors.

APPLICATION EXAMPLE 7

In the robot according to the application example described above, it is preferable that the noise detecting unit detects noise frequencies of signals output by the inertia sensors using frequency distributions of signals output by the angle sensors and frequency distributions of the signals output by the inertia sensors.

According to this application example, both the frequency distributions of the signals output by the angle sensors and the frequency distributions of the signals output by the inertia sensors are used. Therefore, it is possible to separate frequency distributions of signals of noise components from oscillation frequency distributions of signals detected by the inertia sensors. As a result, it is possible to accurately specify noise frequencies.

APPLICATION EXAMPLE 8

In the robot according to the application example described above, it is preferable that the noise filters are band rejection filters.

According to this application example, a phase change in bands other than a frequency band that should be removed is reduced. Therefore, it is possible to remove signals of frequency bands of noise components from signals output by the inertia sensors.

APPLICATION EXAMPLE 9

In the robot according to the application example described above, it is preferable that the filter-constant determining unit determines a filter constant referring to the noise frequencies and a table.

According to this application example, it is possible to determine a filter constant without requiring complicated calculation. Therefore, it is possible to reduce burdens related to calculation.

APPLICATION EXAMPLE 10

In the robot according to the application example described above, it is preferable that the noise filters are implemented in the control unit as software.

According to this application example, electronic components and the like for the noise filters are unnecessary. Thus, it is possible to reduce man-hours for soldering and the like. Therefore, it is possible to manufacture the robot with high productivity.

APPLICATION EXAMPLE 11

This application example of the invention is directed to a noise removing method for a robot comprising: detecting a pivoting angle of a driving source; detecting, using an inertia sensor, an inertial force acting on an arm; detecting a noise frequency of the inertia sensor using a signal of the detected pivoting angle and a signal of the detected inertial force; determining a noise filter characteristic for removing noise from the detected information; and removing noise with a noise filter based on the noise filter characteristic.

According to this application example, a pivoting angle of the driving source is detected. An inertial force acting on the arm is detected using the inertia sensor. Subsequently, a noise frequency of the inertia sensor is detected using a signal of the detected pivoting angle and a signal of the detected inertial force. A noise filter characteristic, which is a characteristic for removing noise from the detected information, is determined. Noise is removed by a noise filter based on the noise filter characteristic.

Therefore, it is possible to set the noise filter characteristic to be a characteristic for removing noise peculiar to the inertia sensor. Therefore, it is possible to accurately remove the noise. As a result, it is possible to prevent oscillation of a feedback system including the inertia sensor.

BRIEF DESCRIPTION OF THE DRAWINGS

The invention will be described with reference to the accompanying drawings, wherein like numbers reference like elements.

FIGS. 4A to 4C are diagrams for explaining the process for removing noise from a sensor output signal.

DESCRIPTION OF EXEMPLARY EMBODIMENTS

Embodiments of the invention are explained below with reference to the accompanying drawings. In the figures referred to below, in order to show layers and members in sizes of recognizable degrees, scales of the layers and the members are set different from actual scales.

First Embodiment

Figure 1:
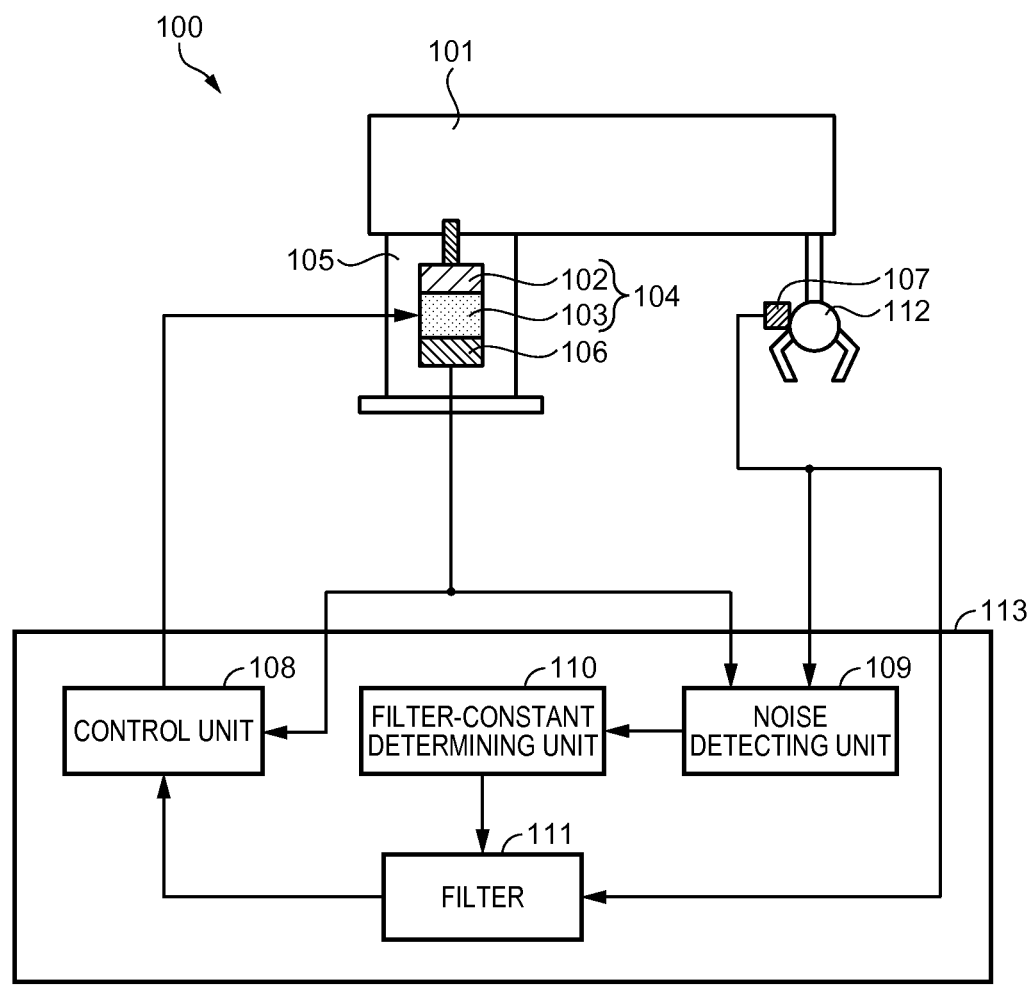
FIG. 1 is a block diagram showing a schematic configuration of a robot according to a first embodiment.

In a first embodiment, a robot and a characteristic arm control method performed by the robot are explained with reference to FIG. 1 to FIGS. 4A to 4C. FIG. 1 is a block diagram showing a schematic configuration of a robot according to the first embodiment.

As shown in FIG. 1, a robot 100 includes a base 105.

An arm coupling section 104 is set on the inside of the base 105. In the arm coupling section 104, an angle sensor 106, a motor 103 functioning as a driving source, and a torque transmitting mechanism 102 are arranged in this order on the same axis. One end of an output shaft of the motor 103 is connected to the angle sensor 106. The angle sensor 106 includes an encoder and detects a pivoting angle of the motor 103. The other end of the output shaft of the motor 103 is connected to an input shaft of the torque transmitting mechanism 102. The torque transmitting mechanism 102 is a reduction gear that is set to a predetermined reduction ratio. Therefore, a pivoting angle of an output shaft of the torque transmitting mechanism 102 is a value obtained by dividing the pivoting angle of the motor 103 by the reduction ratio.

The output shaft of the torque transmitting mechanism 102 is connected to one end of an arm 101. Therefore, the arm 101 rotates according to the rotation of the motor 103. A robot hand 112 is set at the other end of the arm 101. An inertia sensor 107 is set on the robot hand 112. The inertia sensor 107 is an oscillation type gyro sensor. The inertia sensor 107 detects angular velocity of the arm 101 at the time when the arm 101 rotates.

The robot 100 includes a control device 113. The control device 113 includes a CPU (central processing unit) that functions as a processor to perform various kinds of arithmetic processing and a memory that stores various kinds of information. The control device 113 is connected to the CPU via an input and output interface and a data bus. The control device 113 includes, as main functional units, a control unit 108, a noise detecting unit 109, a filter-constant determining unit 110, and a filter 111 functioning as a noise filter. These functions are incorporated in software and stored in the memory. The CPU carries out the functions according to the software.

The control unit 108 controls a pivoting action of the arm 101 and an action of the robot hand 112. The noise detecting unit 109 receives the input of a signal of the pivoting angle of the motor 103 output by the angle sensor 106 and a signal of the pivoting angular velocity of the arm 101 output by the inertia sensor 107. The noise detecting unit 109 detects a noise frequency included in an output signal of the inertia sensor 107. The noise frequency is also referred to as detuning frequency.

The filter-constant determining unit 110 sets a constant of the filter 111 referring to the noise frequency and a constant table. The filter 111 receives the input of the signal of the pivoting angular velocity of the arm 101 output by the inertia sensor 107. The filter 111 removes noise from the signal of pivoting angular velocity on the basis of the set constant.

The flow of various signals is explained below. First, the control unit 108 outputs a driving signal to the motor 103. Consequently, the motor 103 operates and the arm 101 pivots. The angle sensor 106 outputs a motor angle signal indicating the pivoting angle of the motor 103 to the control unit 108 and the noise detecting unit 109. The inertia sensor 107 outputs an arm angular velocity signal, which is a signal of the pivoting angular velocity of the arm 101, to the noise detecting unit 109 and the filter 111.

The noise detecting unit 109 receives the input of the motor angle signal and the arm angular velocity signal and calculates a noise frequency. The noise detecting unit 109 outputs information concerning the calculated noise frequency to the filter-constant determining unit 110. The filter-constant determining unit 110 computes the constant of the filter 111 from the information concerning the noise frequency. The filter-constant determining unit 110 sets the constant of the filter 111. The filter 111 receives the input of the arm angular velocity signal from the inertia sensor 107. The filter 111 removes noise from the arm angular velocity signal using the set constant and outputs the arm angular velocity signal to the control unit 108.

Figure 2:
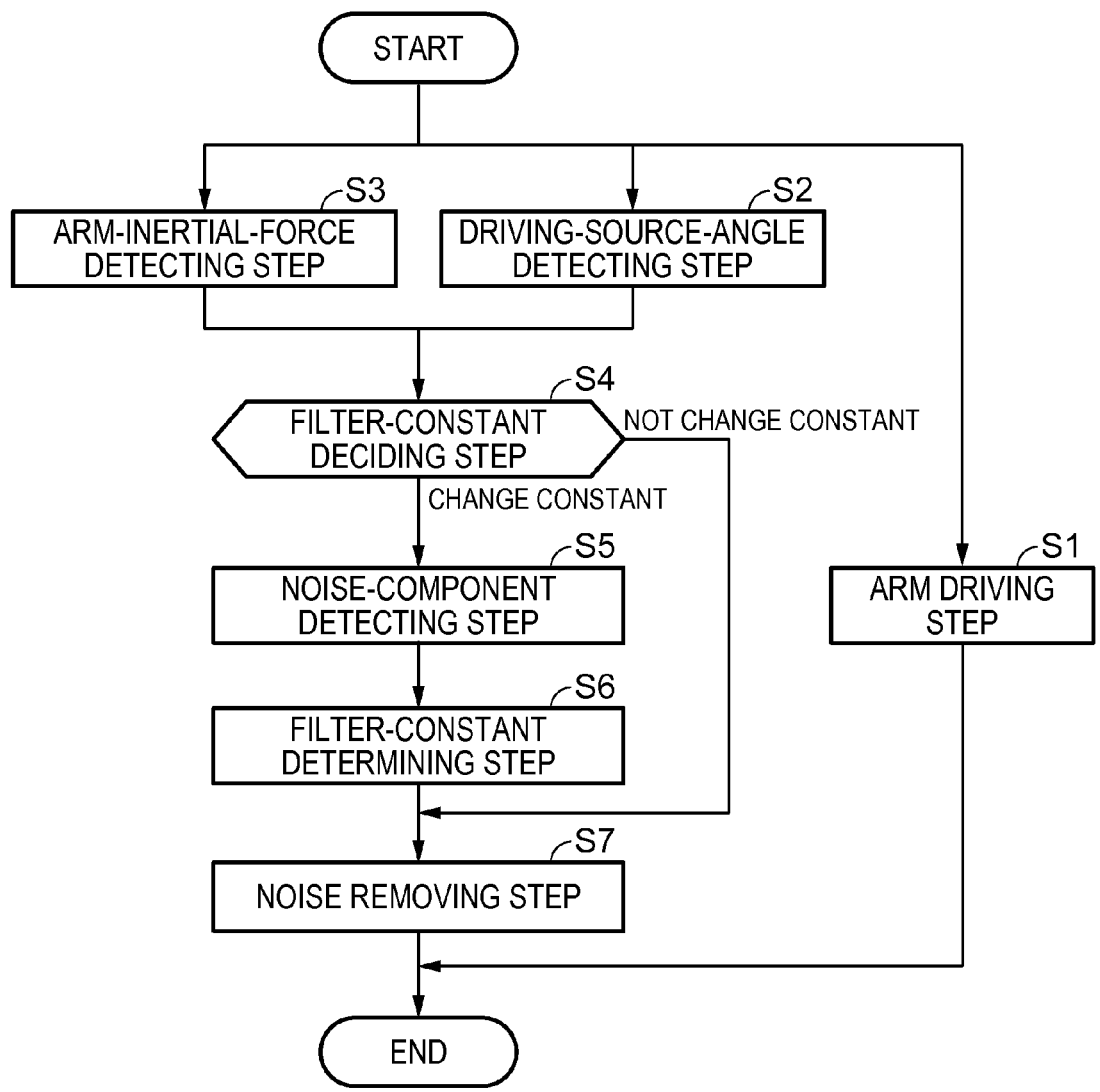
FIG. 2 is a flowchart for explaining a process for removing noise from a sensor output signal.

FIG. 2 is a flowchart for explaining a process for removing noise from a sensor output signal. In FIG. 2, step S1 is equivalent to an arm driving step. This step is a step of the control unit 108 driving the motor 103 and pivoting the arm 101. Step S1 is performed in parallel to other steps. Step S2 is equivalent to a driving-source-angle detecting step. This step is a step of the angle sensor 106 detecting an angle of the motor 103 and outputting a motor angle signal. The process shifts to step S4. Step S3 is equivalent to an arm-inertial-force detecting step. This step is a step of the inertia sensor 107 detecting and outputting the angular velocity of the arm 101. The process shifts to step S4. Step S2 and step S3 are performed in parallel.

Step S4 is equivalent to a filter-constant deciding step. This step is a step of deciding whether the constant of the filter 111 is changed. When the constant is changed, the process shifts to step S5. When the constant is not changed, the process shifts to step S7. Step S5 is equivalent to a noise-component detecting step. This step is a step of the noise detecting unit 109 calculating a noise frequency peculiar to the inertia sensor 107. The process shifts to step S6. Step S6 is equivalent to a filter-constant determining step. This step is a step of the filter-constant determining unit 110 setting the constant of the filter 111 referring to the noise frequency. The process shifts to step S7. Step S7 is equivalent to a noise removing step. This step is a step of the filter 111 receiving the input of the arm angular velocity signal from the inertia sensor 107, removing noise, and outputting the arm angular velocity signal to the control unit 108. The process for removing noise from a sensor output signal is then ended.

FIGS. 3A to 3C and FIGS. 4A to 4C are diagrams for explaining the process for removing noise from a sensor output signal. The method of removing noise from a sensor output signal is explained in detail with reference to FIGS. 3A to 3C and FIGS. 4A to 4C with the figures associated with the steps shown in FIG. 2. An explanation of known steps S1 to S3 is omitted. In the filter-constant determining step of step S4, it is decided whether the constant of the filter 111 is set. The constant of the filter 111 only has to be set once after the filter 111 is replaced and does not need to be reset until the filter 111 is replaced again. When the constant needs to be changed according to a change in the environment, the constant of the filter 111 may be set again.

Figure 3A:
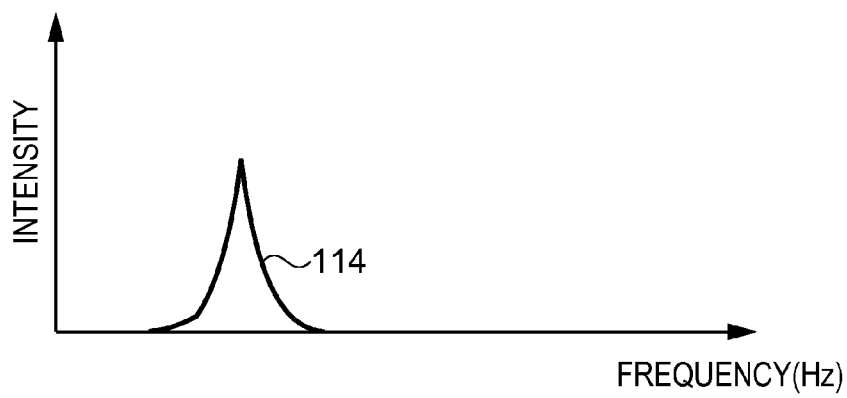
FIGS. 3A to 3C are diagrams for explaining the process for removing noise from a sensor output signal.
Figure 3B:
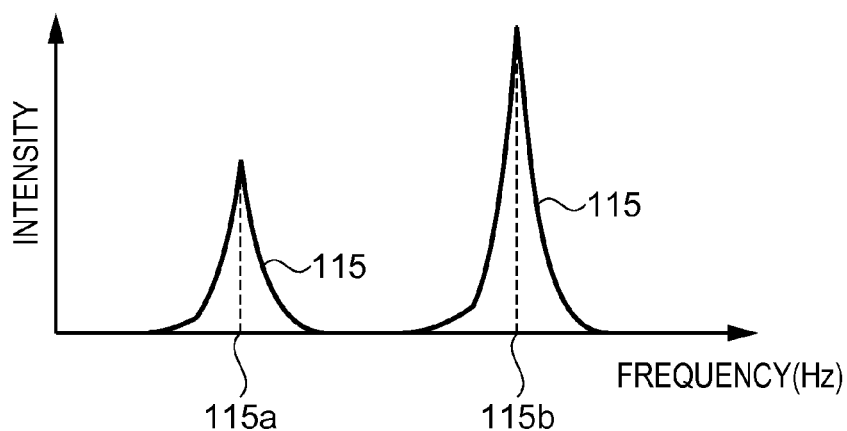
Figure 3C:
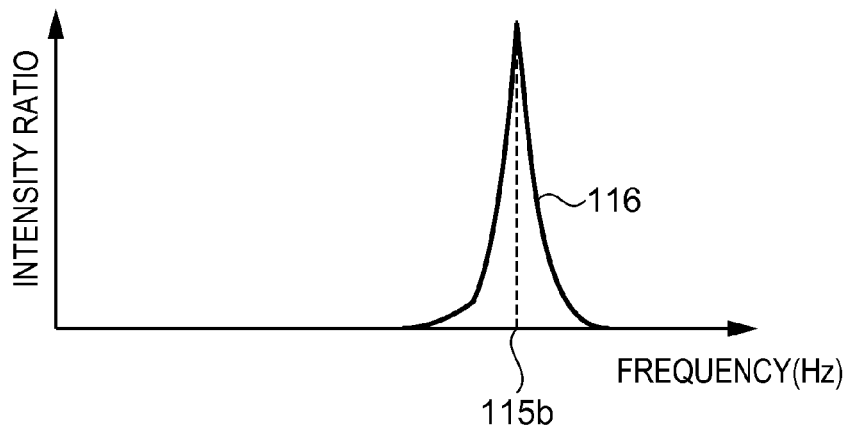

FIGS. 3A to 3C are graphs corresponding to the noise-component detecting step of step S5. In FIGS. 3A to 3C, the abscissa indicates a frequency. The frequency is higher on the right side than on the left side. In FIGS. 3A and 3B, the ordinate indicates intensity. The intensity is higher on the upper side than on the lower side. In FIG. 3C, the ordinate indicates an intensity ratio. The intensity ratio is higher on the upper side than on the lower side. The noise detecting unit 109 receives the input of the motor angle signal output by the angle sensor 106. The noise detecting unit 109 divides the motor angle signal by a reduction ratio. The motor angle signal is a signal that changes according to time set as a parameter. The noise detecting unit 109 differentiates the motor angle signal with time. Consequently, an angular velocity signal of the arm 101 is obtained. The noise detecting unit 109 subjects the divided motor angle signal to Fourier transform to thereby calculate a first angular velocity spectrum 114 serving as a frequency distribution shown in FIG. 3A.

The noise detecting unit 109 receives the input of the arm angular velocity signal output by the inertia sensor 107. The arm angular velocity signal is a signal that changes according to time set as a parameter. The noise detecting unit 109 subjects the arm angular velocity signal of the inertia sensor 107 to Fourier transform to thereby calculate a second angular velocity spectrum 115 serving as a frequency distribution shown in FIG. 3B. In the second angular velocity spectrum 115, two places are formed where the frequency intensity peaks. One is a pivoting speed frequency 115a due to the pivoting of the arm 101 and the other is a noise frequency 115b peculiar to the inertia sensor 107.

Subsequently, the noise detecting unit 109 divides the second angular velocity spectrum 115 by the first angular velocity spectrum 114. As a result, a third angular velocity spectrum 116 shown in FIG. 3C is calculated. In the third angular velocity spectrum 116, the peak of the pivoting speed frequency 115a decreases and only the peak of the noise frequency 115b remains. Consequently, the noise frequency 115b can be detected.

FIGS. 4A to 4C are diagrams corresponding to the filter-constant determining step of step S6. FIG. 4A is a block diagram showing the filter 111. The block diagram can be represented as indicated by the following formulas.

a: A first constant 402 serving as a filter constant.
b: A second constant 403 serving as a filter constant.
c: A third constant 404 serving as a filter constant.
d: A fourth constant 405 serving as a filter constant.
e: A fifth constant 406 serving as a filter constant.
$z^{-1}$: A delay element 401.

$$\frac{a + bZ^{-1} + cZ^{-2}}{1 - dZ^{-1} - eZ^{-2}}$$

A noise filter characteristic, which is a characteristic for the filter 111 to remove noise, is determined by the first to fifth constants 402 to 406. FIG. 4B shows an example of a constant table 117 serving as a table referred to when a filter constant is set. As shown in FIG. 4B, in the constant table 117, the first to fifth constants 402 to 406 are set to correspond to the noise frequency 115b. The width of a cutoff frequency is not specifically limited. In this embodiment, an example in which the width of the cutoff frequency is 50 Hz is shown in the constant table 117. The width of the cutoff frequency is also referred to as removal band. The constant table 117 is not limited to this example and is desirably calculated by performing an experiment beforehand. The filter-constant determining unit 110 determines the first to fifth constants 402 to 406 referring to the noise frequency 115b and the constant table 117. The filter-constant determining unit 110 sets the first to fifth constants 402 to 406 as parameters of the filter 111.

FIG. 4C is a graph showing a noise filter characteristic of the filter 111. The ordinate indicates a gain. The gain is higher on the upper side than on the lower side. The abscissa indicates a frequency. The frequency is higher on the right side than on the left side. A filter characteristic line 118 indicates a frequency characteristic of the filter 111 for allowing a signal to pass. As shown in FIG. 4C, the filter characteristic line 118 indicates a characteristic for attenuating a signal of a frequency within a removal band 118a around the noise frequency 115b. The filter 111 is a band removing filter that allows signals of frequencies lower and higher than the removal band 118a around the noise frequency 115b to pass.

In the noise removing step of step S7, the arm angular velocity signal is input to the filter 111. The first to fifth constants 402 to 406 are already set in the filter 111. Therefore, the filter 111 removes noise of the noise frequency 115b from the arm angular velocity signal and outputs the arm angular velocity signal to the control unit 108. Thereafter, the step of removing noise from a sensor output signal ends.

As explained above, with the robot 100 according to this embodiment, the effects explained below can be obtained.

(1) According to this embodiment, the noise detecting unit 109 detects the noise frequency 115b in noise peculiar to the inertia sensor 107 using an output of the angle sensor 106 and an output of the inertia sensor 107. The filter-constant determining unit 110 determines a noise filter characteristic using the noise frequency 115b. The noise filter characteristic corresponds to a characteristic peculiar to the inertia sensor 107. The filter 111 is connected to the inertia sensor 107. The filter 111 removes noise from the output of the inertia sensor 107 according to the noise filter characteristic. Therefore, the control unit 108 can control the arm 101 using the output of the inertia sensor 107 in which noise is attenuated. As a result, the control unit 108 can prevent oscillation of a feedback system including the inertia sensor 107.

(2) According to this embodiment, both the first angular velocity spectrum 114 of the output of the angle sensor 106 and the second angular velocity spectrum 115 of the output of the inertia sensor 107 are used. Therefore, it is possible to separate a signal of the noise frequency 115b from an oscillation frequency distribution of a signal detected by the inertia sensor 107. As a result, it is possible to accurately specify the noise frequency 115b.

(3) According to this embodiment, the filter characteristic line 118 of the filter 111 indicates the band removing filter. Therefore, it is possible to reduce a phase change in bands other than a frequency band that should be removed. Further, it is possible to remove a signal in a frequency band of a noise component from a signal output by the inertia sensor 107.

(4) According to this embodiment, the filter-constant determining unit 110 determines a filter constant from the noise frequency 115b referring to the constant table 117. Therefore, since it is possible to determine a filter constant without requiring complicated calculation, it is possible to reduce burdens related to calculation.

(5) According to this embodiment, the filter 111 is implemented in the control device 113 as software. Therefore, electronic components and the like for the filter 111 are unnecessary. Thus, it is possible to reduce man-hours for soldering and the like. Therefore, it is possible to provide the robot 100 that can be manufactured with high productivity.

(6) According to this embodiment, the pivoting angle of the motor 103 is detected in the driving-source-angle detecting step of step S2. The angular velocity of the arm 101 is detected using the inertia sensor 107 in the arm-inertial-force detecting step of step S3. Subsequently, in the noise-component detecting step of step S5, the noise frequency 115b of the inertia sensor 107 is detected using the signal of the pivoting angle detected in the driving-source-angle detecting step and the signal of the inertial force detected in the arm-inertial-force detecting step. In the filter-constant determining step of step S6, the noise filter characteristic, which is the characteristic for removing noise from the detected information, is determined. In the noise removing step of step S7, noise is removed by the filter 111 based on the noise filter characteristic.

Therefore, since the noise filter characteristic is the characteristic of noise peculiar to the inertia sensor 107, it is possible to accurately remove noise in the noise removing step. As a result, it is possible to prevent oscillation of the feedback system including the inertia sensor 107.

(7) According to this embodiment, the control device 113 automatically detects the noise frequency 115b of the inertia sensor 107. The filter-constant determining unit 110 automatically sets the first to fifth constants 402 to 406 of the filter 111 that removes noise of the noise frequency 115b. The filter 111 removes noise of the inertia sensor 107. Consequently, it is possible to stabilize the feedback system including the inertia sensor 107. Since a filter constant is set without operation by an operator, it is possible to operate the robot 100 with high productivity.

Second Embodiment

A robot and a characteristic noise removing method performed by the robot according to a second embodiment are explained with reference to FIG. 5 and FIGS. 6A to 6C. This embodiment is different from the first embodiment in that the number of arms is increased from one to two. An explanation of the similarities to the first embodiment is omitted.

Figure 5:
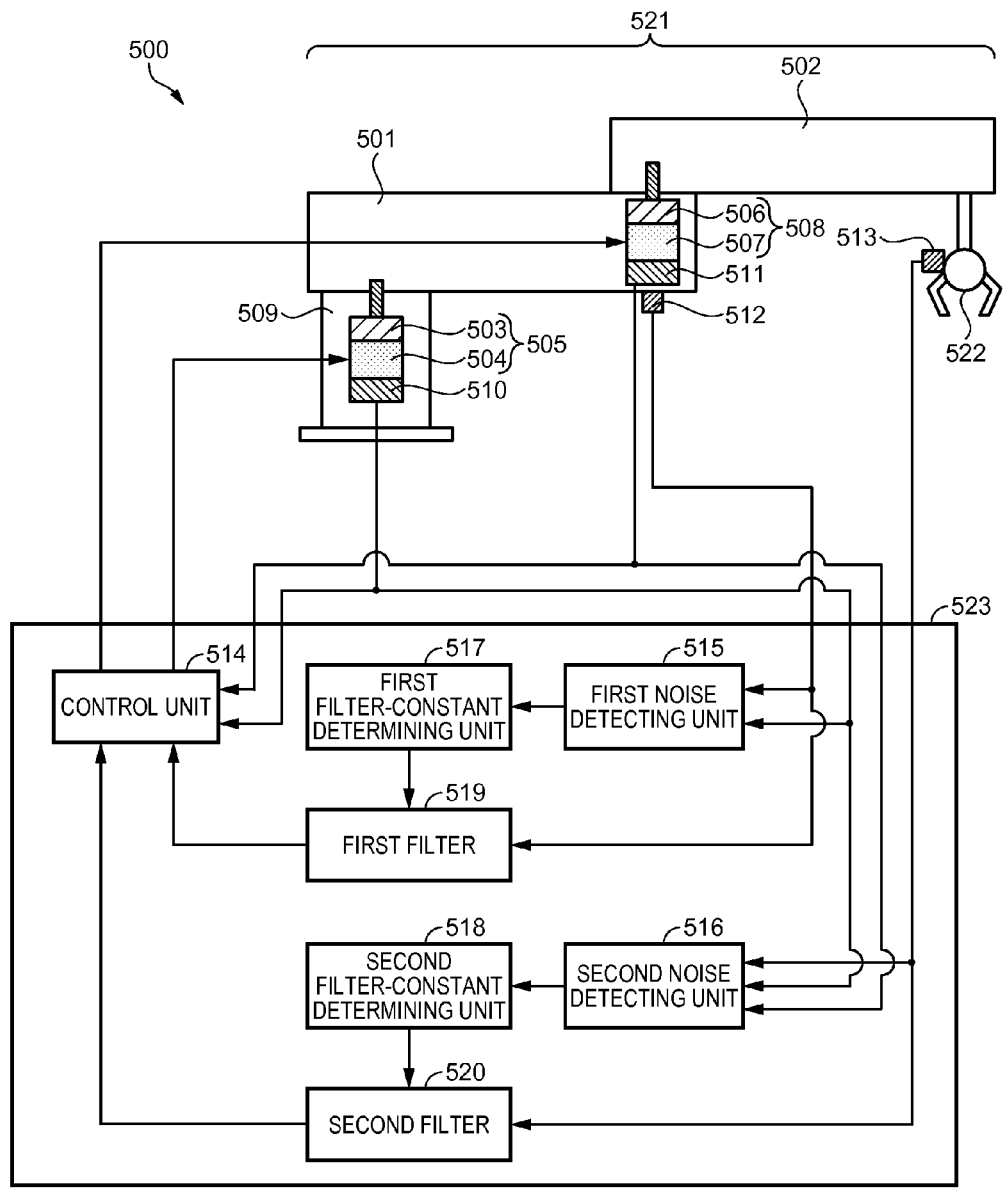
FIG. 5 is a block diagram showing a schematic configuration of a robot according to a second embodiment.

In this embodiment, the number of arms is two as shown in a block diagram showing a schematic configuration according to the second embodiment of FIG. 5. A robot 500 includes a base 509. In the base 509, a first angle sensor 510, a first motor 504 functioning as a driving source, and a first torque transmitting mechanism 503 are arranged in this order one on top of another on the same axis. The first torque transmitting mechanism 503 and the first motor 504 configure a first arm coupling section 505.

A first arm 501 is connected to an output shaft of the first torque transmitting mechanism 503. The first arm 501 pivots according to driving of the first motor 504. The forms of the base 509, the first angle sensor 510, the first arm coupling section 505, and the first arm 501 are the same as the forms of the base 105, the angle sensor 106, the arm coupling section 104, and the arm 101 according to the first embodiment. Therefore, an explanation of the base 509, the first angle sensor 510, the first arm coupling section 505, and the first arm 501 is omitted.

In the arm 501, on the opposite side of the first arm coupling section 505, a second angle sensor 511, a second motor 507 functioning as a driving source, and a second torque transmitting mechanism 506 are arranged in this order one on top of another on the same axis. The second torque transmitting mechanism 506 and the second motor 507 configure a second arm coupling section 508. The first torque transmitting mechanism 503 is a reduction gear that reduces speed at a first reduction ratio. The second torque transmitting mechanism 506 is a reduction gear that reduces speed at a second reduction ratio. The forms of the second angle sensor 511 and the second arm coupling section 508 are the same as the forms of the first angle sensor 510 and the first arm coupling section 505. Therefore, an explanation of the second angle sensor 511 and the second arm coupling section 508 is omitted. In the first arm 501, a first inertia sensor 512 is set near the second angle sensor 511.

A second arm 502 is connected to an output shaft of the second torque transmitting mechanism 506. The second arm 502 pivots according to driving of the second motor 507. The first arm 501, the second arm 502, the first arm coupling section 505, and the second arm coupling section 508 configure an arm body 521. In the second arm 502, a robot hand 522 is set at an end on the opposite side of the second arm coupling section 508. A second inertia sensor 513 is set on the robot hand 522. The first inertia sensor 512 and the second inertia sensor 513 are gyro sensors of an oscillation type. The first inertia sensor 512 detects angular velocity of the first arm 501 at the time when the first arm 501 rotates. The second inertia sensor 513 detects absolute angular velocity of the second arm 502 with respect to the base 509.

The robot 500 includes a control device 523. Like the control device 113 in the first embodiment, the control device 523 includes a CPU (central processing unit), a memory, an input and output interface, and a data bus and includes the same functions. As main functional units, the control device 523 includes a control unit 514, a first noise detecting unit 515, a first filter-constant determining unit 517, and a first filter 519 functioning as a noise filter. The control unit 514, the first noise detecting unit 515, the first filter-constant determining unit 517, and the first filter 519 respectively include functions that are the same as the functions of the control unit 108, the noise detecting unit 109, the filter-constant determining unit 110, and the filter 111 in the first embodiment.

As main functional units, the control device 523 includes a second noise detecting unit 516, a second filter-constant determining unit 518, and a second filter 520 functioning as a noise filter. The second filter-constant determining unit 518 and the second filter 520 respectively include functions that are the same as the functions of the filter-constant determining unit 110 and the filter 111 in the first embodiment. The second noise detecting unit 516 includes a function similar to the function of the noise detecting unit 109 in the first embodiment. The second noise detecting unit 516 is different from the noise detecting unit 109 in that signals of the two angle sensors, i.e., the first angle sensor 510 and the second angle sensor 511 are input to the second noise detecting unit 516. These functions are incorporated in software and stored in the memory. The CPU carries out the functions according to the software.

In a series of processes for removing noise from a sensor output signal, the arm driving step of step S1 to the filter-constant deciding step of step S4 are the same as those in the first embodiment. Therefore, an explanation of the steps is omitted. In step S5, the first noise detecting unit 515 detects a noise frequency of the first inertia sensor 512 and the second noise detecting unit 516 detects a noise frequency of the second inertia sensor 513. Processing contents carried out by the first noise detecting unit 515, the first filter-constant determining unit 517, and the first filter 519 in steps S5 to S7 are the same as the processing contents carried out by the noise detecting unit 109, the filter-constant determining unit 110, and the filter 111 in the first embodiment. Therefore, an explanation of the processing contents is omitted. Processing contents carried out by the second noise detecting unit 516 are explained.

Figure 6A:
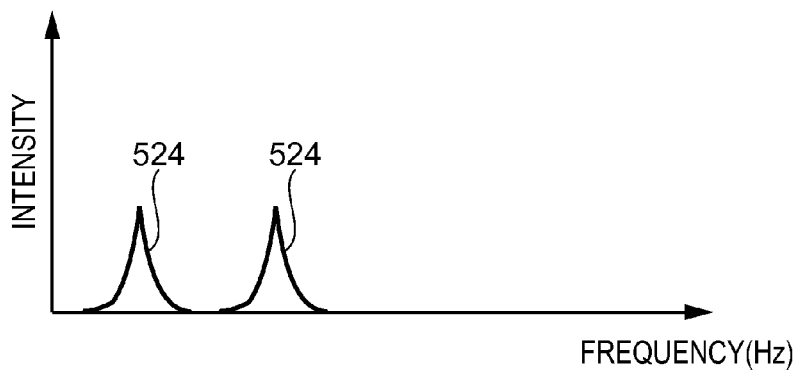
FIGS. 6A to 6C are diagrams for explaining a process for removing noise from a sensor output signal.
Figure 6B:
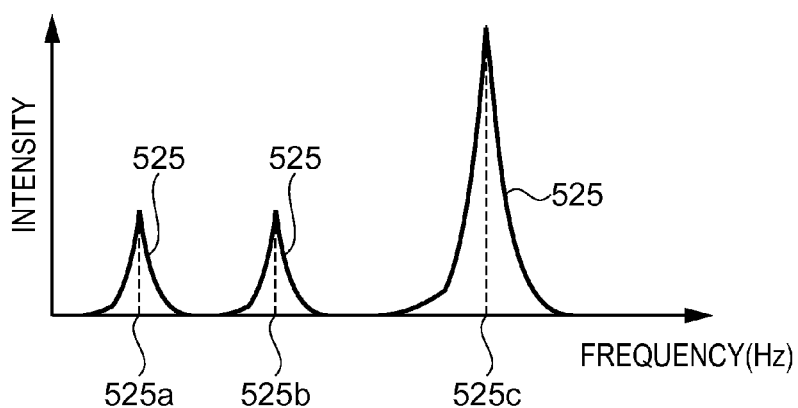
Figure 6C:
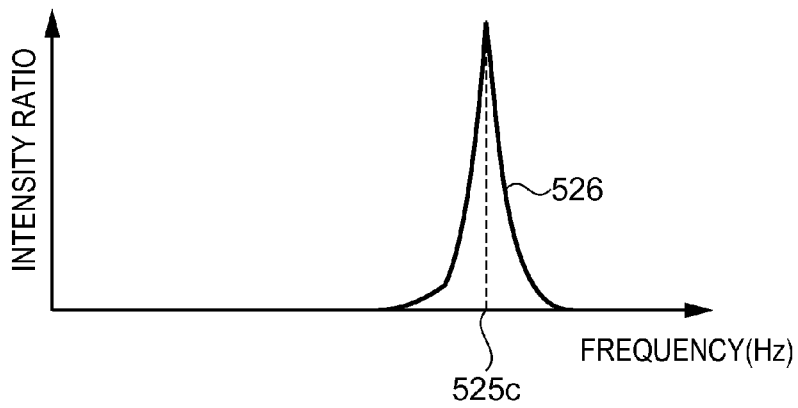

FIGS. 6A to 6C are diagrams for explaining the process for removing noise from a sensor output signal and are graphs corresponding to the noise-component detecting step of step S5. In FIGS. 6A to 6C, the abscissa indicates a frequency. The frequency is higher on the right side than on the left side. In FIGS. 6A and 6B, the ordinate indicates intensity. The intensity is higher on the upper side than on the lower side. In FIG. 6C, the ordinate indicates an intensity ratio. The intensity ratio is higher on the upper side than on the lower side.

The second noise detecting unit 516 receives the input of a first motor angle signal output by the first angle sensor 510, a second motor angle signal output by the second angle sensor 511, and a second arm angular velocity signal output by the second inertia sensor 513. The second noise detecting unit 516 divides the first motor angle signal by the first reduction ratio. The second noise detecting unit 516 divides the second motor angle signal by the second reduction ratio. Subsequently, the second noise detecting unit 516 forms a connected motor signal obtained by connecting the divided first motor angle signal and the divided second motor angle signal.

A motor angle signal is a signal that changes according to time set as a parameter. The second noise detecting unit 516 differentiates the connected motor signal with the time. Consequently, a connected angular velocity signal obtained by connecting angular velocity signals of the first arm 501 and the second arm 502 is obtained. The second noise detecting unit 516 subjects the connected angular velocity signal to Fourier transform to thereby calculate a fourth angular velocity spectrum 524 serving as a frequency distribution shown in FIG. 6A.

The second noise detecting unit 516 receives the input of the second arm angular velocity signal output by the second inertia sensor 513. The second arm angular velocity signal is a signal that changes according to time set as a parameter. The second noise detecting unit 516 subjects the second arm angular velocity signal to Fourier transform to thereby calculate a fifth angular velocity spectrum 525 serving as a frequency distribution shown in FIG. 6B. In the fifth angular velocity spectrum 525, there are three places where the frequency intensity peaks. One is a first pivoting speed frequency 525a due to the pivoting of the first arm 501, another is a second pivoting speed frequency 525b due to the pivoting of the second arm 502, and the other is a noise frequency 525c peculiar to the second inertia sensor 513.

Subsequently, the second noise detecting unit 516 divides the fifth angular velocity spectrum 525 by the fourth angular velocity spectrum 524. As a result, a sixth angular velocity spectrum 526 shown in FIG. 6C is calculated. In the sixth angular velocity spectrum 526, the peaks of the first pivoting speed frequency 525a and the second pivoting speed frequency 525b decrease and only the peak of the noise frequency 525c remains. Consequently, the noise frequency 525c can be detected.

In the filter-constant determining step of step S6, the noise frequency 525c is output from the second noise detecting unit 516 to the second filter-constant determining unit 518. The second filter-constant determining unit 518 determines, according to a table prepared in advance, a filter constant for cancelling the noise frequency 525c. The second filter-constant determining unit 518 sets the determined constant in the second filter 520. Consequently, in the noise removing step of step S7, noise is removed from the second arm angular velocity signal. Thereafter, the process for removing noise from a sensor output signal ends.

As explained above, with the robot 500 according to this embodiment, the effects explained below can be obtained.

(1) According to this embodiment, the second noise detecting unit 516 automatically detects the noise frequency of the second inertia sensor 513. The second filter-constant determining unit 518 automatically sets the constant of the second filter 520 for removing noise. The second filter 520 removes noise of the second inertia sensor 513. Consequently, the control device 523 can stably drive a feedback system including the second inertia sensor 513.

(2) According to this embodiment, the robot 500 includes the arm body in which the arms and the arm coupling sections are alternately coupled. Therefore, the first arm 501 and the second arm 502 can move freely. The second noise detecting unit 516 detects the noise frequency 525c of the second inertia sensor 513 from outputs of the first angle sensor 510 and the second angle sensor 511 and an output of the second inertia sensor 513. The second filter-constant determining unit 518 determines a noise filter characteristic corresponding to the second inertia sensor 513 using the noise frequency 525c. Therefore, the second filter 520 can remove noise of the second noise detecting unit 516. As a result, in the robot 500 including the arm body in which the arms and the arm coupling sections are alternately coupled, as in the robot 100 according to the first embodiment, the control unit 514 can prevent oscillation of the feedback system including the second inertia sensor 513.

Embodiments of the invention are not limited to the embodiments explained above. Various alterations and improvements can be applied to the embodiments. Some modifications are explained below.

Modification 1

In the first embodiment, the robot 100 is a robot of a horizontal multi-joint robot form. However, the form of the robot is not limited to this. The method explained above can be used for robots of various forms such as a vertical multi-joint robot, a Cartesian coordinate robot, and a parallel link robot. In this case, noise of an inertia sensor can be removed using a method same as the method explained above.

In the case of the Cartesian coordinate robot, since an inertia sensor moves linearly, an acceleration sensor is used. In this case, noise peculiar to the acceleration sensor can be detected using data such as a rotation angle of a rotary motor and a moving distance of a linear motor and an output of the acceleration sensor. The noise of the acceleration sensor can be removed using a filter.

Modification 2

In the first embodiment, the first to fifth constants 402 to 406 are determined using the constant table 117. However, the determination of the first to fifth constants 402 to 406 is not limited to this. A formula for calculating the first to fifth constants 402 to 406 may be used. Consequently, it is possible to more finely set the first to fifth constants 402 to 406.

Modification 3

In the first embodiment, the filter 111 is a band removing filter. However, the filter 111 may be a low-pass filter. The filter 111 may be any filter as long as the filter can remove noise of the inertia sensor 107. Since the number of constants is smaller in the low-pass filter than in the band removing filter, it is possible to reduce an amount of data stored in the memory.

Modification 4

In the first embodiment, the angle of the arm 101 is detected using the angle sensor 106 and the inertia sensor 107. After the constant of the filter 111 is set, the angle of the arm 101 may be detected using only the inertia sensor 107. It is possible to easily detect the angle of the arm 101. The contents of the modifications 1 to 4 can be applied to the second embodiment as well.

Modification 5

In the second embodiment, the robot includes the two arms. However, the number of arms may be three or more. In this case, the arms can perform a more complicated action.

Modification 6

In the second embodiment, the connected motor signal obtained by connecting the first motor angle signal divided by the first reduction ratio and the second motor angle signal divided by the second reduction ratio is formed. The second noise detecting unit 516 calculates the fourth angular velocity spectrum 524 using the connected motor signal. However, the method of calculating the fourth angular velocity spectrum 524 is not limited to this. First, the first arm angular velocity spectrum is calculated from the first motor angle signal divided by the first reduction ratio. Subsequently, the second arm angular velocity spectrum is calculated from the second motor angle signal divided by the second reduction ratio. The fourth angular velocity spectrum 524 may be calculated using the first arm angular velocity spectrum and the second angular velocity spectrum. A method with a short calculation time may be selected.

What is claimed is:

1. A robot comprising:
    an arm;
    an arm coupling section connected to the arm and including a driving source that pivots or translates the arm;
    a base connected to the arm coupling section;
    an angle sensor that detects a pivoting angle of the driving source;
    an inertia sensor that is attached to the arm and detects an inertial force acting on the arm;
    a noise filter that removes noise from an output of the inertia sensor;
    a control unit that controls a pivoting action of the arm;
    a noise detecting unit that detects a noise frequency of the inertia sensor from an output of the angle sensor and the output of the inertia sensor; and
    a filter-constant determining unit that determines, using the noise frequency, a noise filter characteristic of the noise filter for removing noise.

2. The robot according to claim 1, wherein the noise detecting unit detects a noise frequency of a signal output by the inertia sensor using both a frequency distribution of a signal output by the angle sensor and a frequency distribution of the signal output by the inertia sensor.

3. The robot according to claim 2, wherein the noise filter is a band rejection filter.

4. The robot according to claim 3, wherein the filter-constant determining unit determines a filter constant referring to the noise frequency and a table.

5. The robot according to claim 4, wherein the noise filter is implemented in the control unit as software.

6. A robot comprising:
    an arm body to which plural arms and plural arm coupling sections connected to the arms and including driving sources that pivot or translate the arms are alternately coupled;
    a base connected to the arm body;
    plural angle sensors that detect pivoting angles of the driving sources;
    plural inertia sensors that detect inertial forces acting on the arms;
    plural noise filters that remove noise from outputs of the inertia sensors;
    a control unit that controls pivoting actions of the arms;
    a noise detecting unit that detects noise frequencies of the plural inertia sensors from outputs of the plural angle sensors and the outputs of the plural inertia sensors; and
    a filter-constant determining unit that determines, using the noise frequencies, noise filter characteristics of the noise filters for removing noise.

7. The robot according to claim 6, wherein the noise detecting unit detects noise frequencies of signals output by the inertia sensors using:
    frequency distributions of signals output by the angle sensors; and
    frequency distributions of the signals output by the inertia sensors.

8. The robot according to claim 7, wherein the noise filters are band rejection filters.

9. The robot according to claim 8, wherein the filter-constant determining unit determines a filter constant referring to the noise frequencies and a table.

10. The robot according to claim 9, wherein the noise filters are implemented in the control unit as software.

11. A noise removing method for a robot comprising:
    detecting a pivoting angle of a driving source;
    detecting, using an inertia sensor, an inertial force acting on an arm;
    detecting a noise frequency of the inertia sensor using a signal of the detected pivoting angle and a signal of the detected inertial force;
    determining a noise filter characteristic for removing noise from the detected information; and
    removing noise with a noise filter based on the noise filter characteristic.

\* \* \* \* \*